United States Patent [19]

Klinecky et al.

[11] E Re. 30,318

[45] Reissued Jul. 1, 1980

[54] METHOD OF AND APPARATUS FOR PREPARING A WEFT SUPPLY IN A MAGAZINE FOR WEFT INSERTION IN SHUTTLELESS LOOMS

[75] Inventors: Ladislav Klinecky; Stanislav Krmela, both of Sumperk, Czechoslovakia

[73] Assignees: Zbrojovak Vsetin, narodni podnik, Vsetin; Vyzkumny ustav lykovych vlaken, Sumperk, both of Czechoslovakia

[21] Appl. No.: 669,724

[22] Filed: Mar. 23, 1976

Related U.S. Patent Documents

Reissue of:

[64] Patent No.: 3,799,211
Issued: Mar. 26, 1974
Appl. No.: 278,630
Filed: Aug. 7, 1972

[30] Foreign Application Priority Data

Aug. 5, 1971 [CS] Czechoslovakia ..... 5692-71

[51] Int. Cl.[2] ..... D03D 47/36

[52] U.S. Cl. ..... 139/452

[58] Field of Search ..... 139/224, 429, 435, 450, 139/452; 226/97, 118, 195; 28/72.1; 66/125, 132

[56] References Cited

U.S. PATENT DOCUMENTS

| | | | |
|---|---|---|---|
| 3,195,580 | 7/1965 | Fend et al. | 139/224 |
| 3,303,857 | 2/1967 | Scheffel | 139/452 |
| 3,477,476 | 11/1969 | Brouwer et al. | 139/122 |
| 3,580,444 | 5/1971 | Van Mullekom | 139/122 |
| 3,669,328 | 6/1972 | Castelli | 139/452 |

*Primary Examiner*—Henry Jaudon

[57] ABSTRACT

Method of and apparatus for preparing weft supply in a magazine for weft insertion in shuttleless looms, particularly looms with pneumatic or hydraulic weft insertion. The yarn path is prolonged by the action of an air flow in the magazine, into which the weft is continuously fed upon being withdrawn from a supply bobbin. The weft is withdrawn from the magazine in weft inserting intervals in a length sufficient for one pick. The inside of the magazine is constituted to produce a helical air flow which directs the fed weft into a spatial spiral or helox, from which the inserting length is axially withdrawn.

25 Claims, 24 Drawing Figures

METHOD OF AND APPARATUS FOR PREPARING A WEFT SUPPLY IN A MAGAZINE FOR WEFT INSERTION IN SHUTTLELESS LOOMS

Matter enclosed in heavy brackets [ ] appears in the original patent but forms no part of this reissue specification; matter printed in italics indicates the additions made by reissue.

The present invention relates to a method of and an apparatus for preparing a weft supply in a magazine for weft insertion in shuttleless looms, particularly looms with pneumatic or hydraulic weft insertion, said supply being constituted by prolonging the yarn path by action of an air flow in the magazine into which said weft yarn is continuously fed upon being withdrawn from a stationary supply, the weft is withdrawn from the magazine at weft insertion intervals at a length necessary for one weft insertion (one pick). Said apparatus is provided with at least one magazine, mounted between the feeding mechanism and the measuring mechanism, which is arranged in front of the weft inserting mechanism, particularly the nozzle for pneumatic or hydraulic weft insertion in a loom.

In certain types of shuttleless looms, particularly looms with pneumatic or hydraulic weft insertion, it is inevitable that the necessary weft length for the pick be prepared before the insertion by a special measuring device. The advantage of the preliminary preparation of weft is manifested also in gripper looms, in which a high speed of the gripper is made possible; and thus an increase of the quality of the product of the loom.

The weft supply for pneumatic or hydraulic picking is made principally by two methods. According to the first method, weft is intermittently wound from the supply bobbin on to a measuring disc, from which the measured part of the weft is withdrawn and ejected through the inserting nozzle into the shed.

According to the second method, a weft supply of yarn is accumulated pneumatically into a loop form.

For performing such two basic methods, a whole series of devices have been suggested to secure with more or less success the fulfillment of requirements imposed by the continuous and reliable operation of jet looms, particularly the accurate measurement of weft insertion length, the easy changing of the measured weft length, the forming of a weft supply without exceedingly straining the weft, the smooth withdrawal of weft from the supply, etc.

The rotary measuring discs with the winding of weft are substantially divided into single or multiple winding discs with continuous or intermittent winding.

A relatively widely used construction is a measuring device which is used in looms with pneumatic and hydraulic weft insertion which is constituted substantially by two rotary parts rotating at different speeds. One such part produces winding of the weft prepared for further weft insertion, and the other such part finishes the preceding phase by taking off the weft from the detent of the first part immediately before starting weft insertion.

The first or basic part of the above measuring device is constituted by an actual disc shaped magazine provided at its surface with a helical groove for depositing the measured weft; such part is provided with a detent, controlled by an inner cam, for gripping the weft, this being the beginning of the measurement process. The disc shaped magazine with a detent is adjustable to a certain extent in its angle value in view of the position of the batten, this making it possible to adjust the basic length of the measured weft in view of the width of the wooven goods. Smaller changes of the weft length are then performed additively by means of turning the stationary housing of the measuring device with the guiding fork at the inlet recess of the housing, the position of which determines the moment of gripping the weft by the detent and the beginning of the measuring procedure.

The other, second part, the withdrawing part of the measuring device which is constituted by a partial cylindrical segment, moves coaxially at a higher velocity than the first, basic part, and thus at a certain moment, at which the front edge of this second part moves past, or runs ahead of the detent of the first, basic magazine part, the weft guided by said detent is removed therefrom and thus the measured weft yarn supply is released for insertion.

A substantial disadvantage of the said device consists in that approximately only 75 percent of the weft length necessary for the given fabric width is wound on the measuring drum (magazine drum) during each cycle. The necessary missing length is practically measured only during the actual insertion by the adjusted intensity of the weft inserting jet in dependence upon the tension of the inserted weft which is given by the adjusted braking of the weft brake. The resultant of the weft inserting tension, the effect of the weft brake, and the variations in the prestress of the weft influenced by the balloon being constituted, and the varying of weft withdrawal from the supply bobbin, and above all these the different conditions produced by a full and almost exhausted bobbin, considerably influence the regularity of the weft insertion and the dissipation of length of their free ends at the weft depositing end. Aiming at overcoming eventual short weft insertions, the adjusted weft length is prolonged for the sake of quality, however, with a higher waste of material.

A further disadvantage of this method of weft measurement consists in that the measuring device withdraws yarn intermittently from the supply bobbin, or at an undesired varying withdrawing speed during each cycle.

A further, certainly not completely negligible factor, consists in the rather complicated and thus also expensive manufacture of the measuring device. Upon charging the fabric width, the rearrangement of the measuring device is relatively elaborate, the time required for this depending upon the skill and experience of the attendant.

The above disadvantages were not substantially eliminated in a further modification of a measuring device for looms with pneumatic weft insertion. In this measuring device, the detent part is replaced by a pin moved in a direction towards the axis of the drum by an angularly adjustable cam, said pin being mounted in the first or basic part of the magazine disc of the measuring device, the second part of the original embodiment, for securing the removal of the weft yarn, being thus eliminated. The pin projecting above the surface of the measuring drum secures gripping of the weft and the initiation of measurement. By drawing down, or engagement of the pin as far as the level of the measuring drum surface, the weft is released for insertion.

The simplification has certainly influenced the reduction of production costs to a certain extent, however, the range of assortment of weft materials to be processed was restricted in view of the original embodiment, prevailingly to finer and smoother materials.

A method of preparing weft from a stationary weft supply is known by means of a measuring drum or reel, on which the yarn is deposited in several windings. The winding of yarn on to the measuring drum is continuous, the required length being intermittently withdrawn from the wound supply. This method of preparing the weft uses the continuous supply weft to the measuring drum, but is complicated in its construction and takes up a large area, while a change in weft length for insertion is to be performed during rest of the loom by exchange of the groove discs.

According to the other method, the weft supply is constituted by blowing the yarn into a loop form or by blowing or sucking in the weft into a loop.

In the first, case, the weft magazine is made by a tube bent into a loop form, of which the front end is connected to a pressure air source and the rear end of which opens at the point of weft insertion. The weft is brought into the inlet part of the tube, the weft being withdrawn from a stationary bobbin supply via a controllable brake. The tube is provided with a slot on the inner side of the circular part of the tube magazine.

The weft withdrawn from the bobbin via an opened brake is entrained by an air flow through the tube towards its outlet, thus forming a loop. As soon as the beginning of the weft reaches the mouth of the tube, the brake interrupts further feeding, and thus the weft is withdrawn by inertia from the slot and advances into the shed. This device measures, on the one hand, the appurtenant length of the weft, and accelerates, on the other hand, the weft before its actual insertion. The brake is controlled by a light indicator, which is adjustably arranged on that part of the tube which checks the presence of weft in the supply tube. The length of the slot is variable by a limitor traversably mounted on a part of the tube, by means of which a relatively accurate adjustment of the required weft length is made possible even during operation of the loom.

The said device, in spite of meeting [frequency] *frequent* requirements put thereon, works with intermittent weft supply into the magazine, this representing one of the substantial disadvantages of the method of preparing weft for shuttleless looms.

There is a device which operates in accordance with the first method, in which the weft withdrawn from the supply bobbin by feeding rollers is deposited into a rotary hollow body, and is deposited therein by action of centrifugal force on the all in the form of a helix. In order to prevent the yarn from sliding down, it is held by means of a felt ring. From the hollow body, the weft is withdrawn via the brake by a nozzle and is inserted into the shed. The measuring of the necessary length can be controlled by the velocity of the feeding rollers and by change of the interval of release of the brake.

The method of constituting a loop as a weft reserve uses a substantially flat chamber, into which the fed weft is drawn in on a part of its length by the effect of underpressure or by blowing in into a long loop by pressure air from an ejector nozzle.

The disadvantage of this and similar devices consists in its space requirements and intermittent weft feeding, on the one hand, and in the possibility of forming an elongated loop due to air flow or particularly upon using weft material with hight twist.

None of the above-described methods of weft measuring for weft insertion is satisfactory for use with rough yarns, particularly for new yarn material in the form of a flat tape of plastic material as polyolefines etc., or their longitudinally cleaved modifications.

A flat tape body, particularly in higher deniers and with a width of about 4 mm, has substantially different requirements for being prepared for insertion from those of classical materials. A tape, particularly upon being wound onto various types of grooved or other measuring drum magazines, very frequently covers a preceding winding by a following winding and thus unfavorably influences the conditions of withdrawal and insertion of the tape. In further of the known method already described, the brake is the reason for failures which make it impossible to achieve the necessary operational reliability of the apparatus. Neither braking by gripping the weft nor by embracing it is suitable for braking tape materials. Upon the usual axial withdrawal of the tape from a stationary supply bobbin, twists are imparted to the tape, such twists being accumulated upstream of the brake. After such twists pass through the brake, they cause loop forming, which adversely affect the required operational reliability of weaving by the loom.

It is known to use two or more magazines in a weaving machine for color weft change. Each of the magazines operates independently.

The purpose of the present invention is to create a novel method of preparing the weft in the magazine with ejectorial introduction of weft, and to provide a corresponding apparatus, which eliminate to a considerable extent the disadvantages of the methods and apparatus hitherto known; such method and apparatus are suitable for weaving a weft in the form of a narrow tape.

The above-mentioned conditions are substantially fulfilled by the method of preparing a weft supply in the magazine for weft insertion in shuttleless looms, particularly looms with pneumatic or hydraulic weft insertion of the present invention. The method prolongs the yarn path by the effect of an air current in the magazine, into which said weft is continuously fed upon being withdrawn from a stationary supply. The weft is withdrawn from said magazine at weft inserting intervals in a length equivalent to one pick. A helical air flow is created inside the magazine, said air flow directing the fed weft into a partial helix or spiral, from which the picking length of weft is axially withdrawn.

The helical air flow is derived from pressure air [fled] *fed* into the injector magazine or produced inside the magazine by a fan.

For performing the method of preparing a weft supply in the magazine, two basic embodiments of the device are disclosed. According to the first embodiment, the device is provided with at least one magazine mounted between the feeding mechanism and measuring mechanism, the latter of which is arranged in front of the weft inserting mechanism; the weft inserting mechanism may be the nozzle for pneumatic or hydraulic weft insertion. The first embodiment is made in such manner that the magazine is substantially a hollow drum with a rear wall connected to the front wall by a side wall, the front wall being in the form of a convex surface of revolution provided at its center with an outlet opening for the weft. By means of an injector which opens tangentially into the side wall pressure air acting as a weft carrier withdraws weft from the feeding mechanism. The inner part of the side wall is an annular guiding surface which directs an air flow in dependence of the position of the injector axis into a spatial helix or spiral. Said annular guiding surface has two parallel fields of which the rear one, into which the injector opens, and a part of the front field constitute a path for the fed air current, while the remaining part of the front field is provided with ventilation openings for the exit of pressure air from the drum. In the hollow of the drum, on the rear wall thereof, there is parallely arranged a directing body of circular cross section, such body directing the withdrawn weft. The directing body is separated from the side wall and the front wall of the drum by a gap. The side wall of the drum has the shape of a frusto-conical shell, which is connected at is smaller circular base to the rear wall of the drum; the side wall may also be in the form of a circular cylindrical shell.

The axis of the injector is situated in the plane tangential to the side wall of the drum, which has the shape of a frusto-conical shell connected with its smaller circular base to the rear wall of the drum, said axis being normal to the surface straight line of the side wall, said surface line passing through the point of penetration of the injector axis into the side wall.

According to another embodiment of the first modification, the injector axis is situated in a plane tangential to the (a) frusto-conical side wall of the shell which is connected by its smaller base to the rear wall of the drum, or (b) to the side wall in the form of a cylinder, said axis with the surface line of the side wall which passes through the point of penetration of the injector axis into the side wall an angle from 95° to 105°, in the anticlockwise direction.

The device according to the present invention which is destined for longer weft lengths has mounted on the rear field of the guiding surface a helical thread for directing the fed air flow into a spatial spiral or helix, a passage being provided between the top edge and the directing body for the weft to be withdrawn.

The device according to the present invention enables the assembling of several magazines into a design unit of multicolor weaving.

According to an exemplary embodiment of that type, inside one magazine, another magazine is coaxially mounted, of which the side wall and front wall constitute a directing body of the outer drum, through the side wall of which there passes the injector of the inner drum. Said inner drum is parallel to the injector of the outer drum, which has an annular guiding surface larger than the width of the annular guiding surface of the inner drum, and both front surfaces of the rotary guiding surfaces being aligned with respect to the drum axis. The front wall of the inner drum converges into a neck finished by an exit opening, which is flush with the outlet opening of the outer drum or projects therefrom.

According to another basic embodiment, one pair of the outer and inner drums is coaxially assigned another pair of the outer and inner drum in such manner, that the two pairs are mounted behind each other and the front wall of the outer drum of the rear pair of drums constitutes the rear wall of the front pair of drums. The front walls of the rear pair of drums and the front wall of the inner drum of the front pair of drums converge into coaxially arranged necks, of which the exit openings are flush with the exit opening of the outer drum of the front pair of drums or emerges therefrom. The exit openings are covered by a plate in which are arranged in a row guiding outlet openings for weft yarns. Between the measuring mechanism and the front pair of drums there are mounted four guiding eyelets for withdrawing weft yarns from drums. This arrangement insures a reliable weft withdrawal from the magazines.

The second basic embodiment of the device is characterized in that the magazine is substantially a hollow drum with the rear wall provided with at least one sucking opening and connected to the front wall in the form of a convex surface of revolution, provided in the middle with an exit opening for the weft by means of the side wall of which the inner annular guiding surface, in the form of a frusto-conical shell connected with its smaller circular basis to the rear wall, constitutes a path for the air flow. Such side wall has two parallel fields of which the rear field into which the feeding tube for the weft being withdrawn from the feeding mechanism, opens tangentially is a smooth surface and the front field is at least on a part of the surface provided with ventilation openings for the exit of air from the drum. In the hollow of the drum, on the rear wall there is mounted a fan wheel coaxially with the drum, said wheel being surrounded by the wall of the directing body of circular shape for the withdrawn weft, the directing body being separated from the side wall and the front wall by a gap. Said wall is provided with tangential channels confronting the fan wheel, which are directed against the rotary guiding surface of the side wall directing partial air flows from the channels into the helical air flow.

Also this second modification enables the collecting of a plurality of magazines into one construction unit.

According to an exemplary embodiment of the device of that type, an inner magazine is mounted coaxially in the hollow of one magazine, the rear wall of which, in the form of an annular surface, transversely separates the channels into two parts, of which one is directed against the rear field of the outer [dru] *drum*, through which the feeding tube from the inner drum passes, and the other against the rear field of the inner drum, the side wall and the front wall of the inner drum constituting a directing body of the outer drum.

The injector tube is fastened in a sleeve mounted on the side wall of the magazine.

The injector tube and the feeding tube are resiliently flexible for adjusting its inlet end along the nip line of the feeding rollers of the feeding mechanism.

Further features of the present invention and advantages are comprised in the following specification of the method of preparing a weft supply and exemplary embodiments of the appurtenant device.

The advantage of the method of preparing weft in the magazine according to the present invention and the device according to the present invention for performing said method consists in that the weft is fed continuously into the magazine without any impacts and withdrawn therefrom in the same manner. The withdrawal of weft from the magazine is initiated upon a pulse of the gripping mechanism of the measuring device.

To a large extent, impacts in the weft are eliminated. Such impacts in the magazines hitherto known immediately after finishing the insertion of a measured part of the weft thread due to dropping of the weft insertion velocity from maximum to zero.

In the magazine according to the present invention about 85 percent of the weft length necessary for one pick is accumulated, the remaining length being fed by the feeding mechanism during the actual insertion by average weft inserting speed. The weft insertion is finished by closing the gripping mechanism upstream of the inserting nozzle, at which time the weft is simultaneously stopped.

A further substantial advantage is the reduction of the breakage rate to a minimum and the attaining of material economy, which arises by reason of the substantial reduction of the necessary length of projection of the weft ends at the side of the weft front end location.

The advantage of the actual device according to the present invention is its advantageous spatial arrangement, simple magazine manufacture, an easy maintenance, and operational reliability.

The construction of the magazine makes possible the constitution of a device consisting of several magazines for mixing wefts, or for color change, respectively.

Exemplary embodiments of the device according to the present invention are diagrammatically shown in the accompanying drawings of which:

Figure 1:
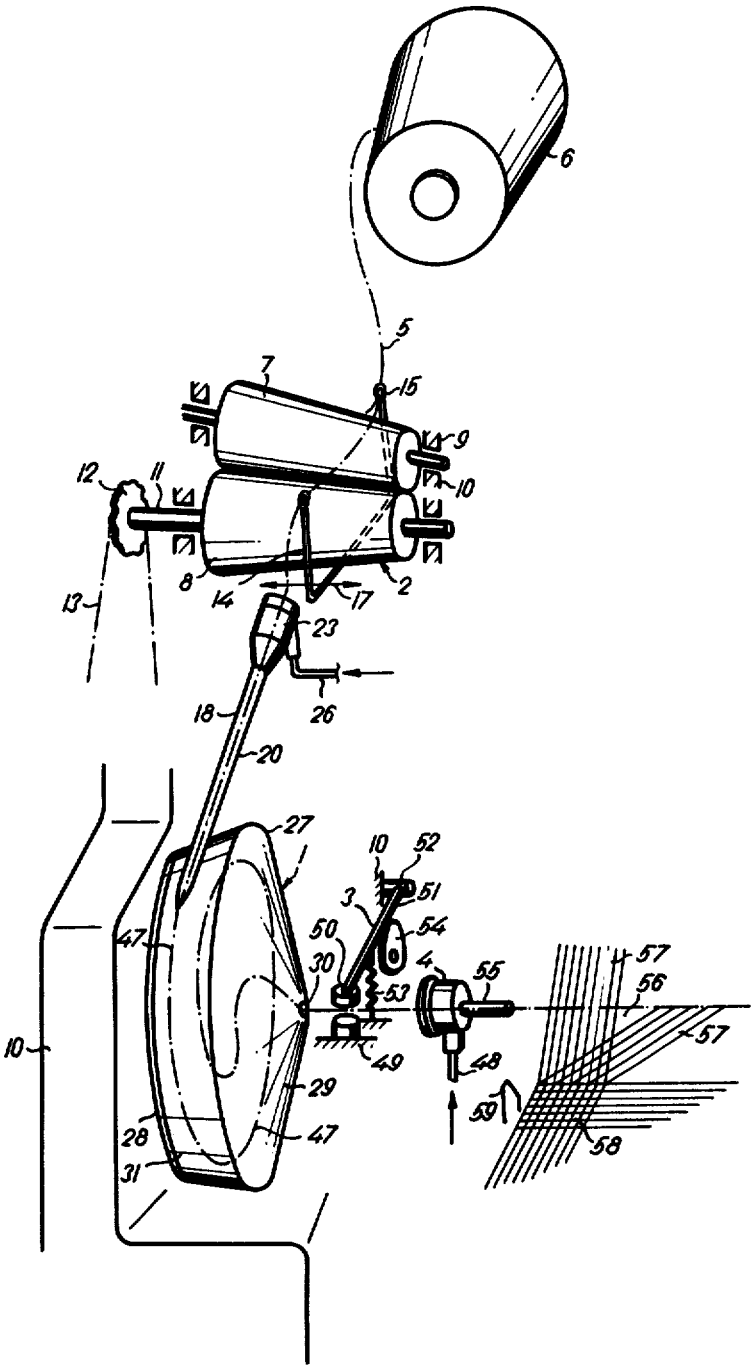
FIG. 1 is a fragmentary view in perspective of a weaving machine with pneumatic weft insertion with a magazine, a feeding and measuring mechanism and a weft inserting nozzle.

Turning now to FIG. 1, there is shown a weft picking device of a loom with pneumatic weft insertion. Such device includes a magazine 1, mounted between a feeding mechanism 2 and a braking or retarding mechanism 3, the latter mechanism being mounted in front of the pneumatic weft inserting nozzle 4 in the weft inserting plane.

The feeding mechanism 2, which withdraws weft 5 which is unwound from a supply bobbin 6, has two feeding rollers 7,8 in the shape of oppositely mounted truncated cones mounted in bearings 9 in a frame 10 of the weft inserting device. The upper feeding roller 7 is freely mounted on the lower feeding roller 8, on the shaft 11 of which there is mounted a sprocket 12 driven by a chain 13 from the driving mechanism (not shown) of the loom. The feeding mechanism 2 is provided with a directing yarn guide 14, constituted by a yoke with two guiding eyelets 15,16 mounted in front of and behind, respectively, the pair of feeding rollers 7,8.

For the purpose of controlling the feeding velocity of the feeding mechanism 2, the directing yarn guide 14 is traversably mounted by means of known means (not shown) along the nip line of feeding rollers 7,8 in the direction of the double arrow 17. The adjustment of the appurtenant position of the directing yarn guide 14 is performed manually or mechanically. An injector 18 is attached to the feeding mechanism 2, said injector opening into the magazine 1.

Injector 18 (FIG. 2) consists of a body on neck 19, into which tube 20 is inserted e.g. by pressing in. Tube 20 is made either as a whole of a resilient flexible plastic, e.g. polyamide and is provided at its end with a sleeve 21 of metal, as shown, or is made of a solid (rigid) plastic. Tube 20 opens tangentially into magazine 1 (FIG. 3). On a thread 22 of the neck body 19 there is screwed the actual neck 23, in the shape of a funnel, which engages the hollow 24 of the body of neck 19 in such manner, that between tube 20 and the end of the actual neck 23 there is a gap 25. Hollow 24 is connected by sleeve 26 to a hose (not shown) from a pressure air source.

The body of neck 19 is connected by a means (not shown) to the directing yarn guide 14 in such manner, that upon its adjustment along the nip line of feeding rollers 7, 8 the actual neck 23 is simultaneously adjusted into an appurtenant position aligned therewith to receive the weft.

Magazine 1 (FIGS. [k] *1*,3) is constituted substantially by a hollow drum 27 preferably made of plastic material, said drum being constituted of a rear wall 28 fastened by means (not shown), e.g., by screwing or cementing to the frame 10 of the weaving machine, a front wall 29 in the form of a frusto-conical shell provided in its center with [an] *a* discharge opening 30 and a side wall 31 in the form of a frusto-conical shell, which is connected with its smaller circular base to the rear wall 28. The inner surface of side wall 31 is constituted by a straight fixed guiding surface 33 through which the sleeve 21 of injector 18 is tangentially connected. Surface 33 is in the form of a surface of revolution, more particularly, the frustrum of a cone.

The guiding surface 33 is separated into two parallel fields 34, 35, of which the rear field 34 is smooth, while the front field 35 is provided on at least a part of its surface with air exhaust or ventilation openings 36. These ventilation openings 36 are distributed either on the whole surface of the front field 35 or only in a certain part of its section. According to another, alternative embodiment, the ventilation openings 36 are made in a section of 170° to 360° expressed in arcuate measure from the point of entrance of injector 18 into the side wall 31 of front field 35 in the anticlockwise direction. In the exemplary embodiment as shown in FIG. 4, the section with ventilation openings 36 beings in about the third of the second quadrant of drum 27 and goes on over the third and fourth quadrants into the first third of the first quadrant, coming there to an end in front of the point of entrance of injector 18 into the side wall 31, the length of sections of the ventilation openings 36 being thus in arcuate measure about 240°.

Figure 3:
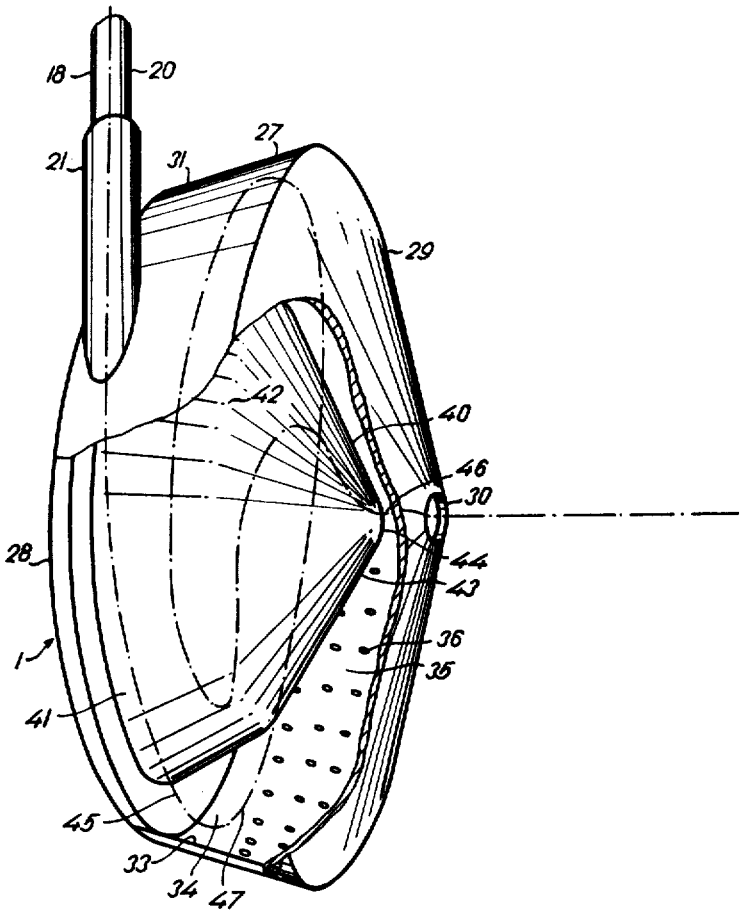
FIG. 3 is a view in perspective of the magazine with an injector.
Figure 4:
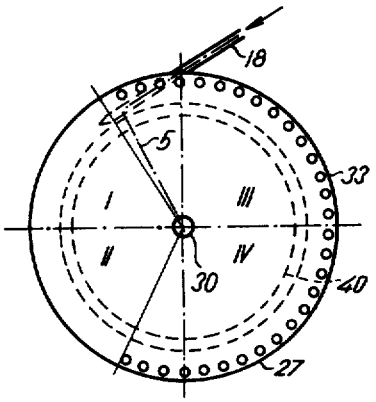
FIG. 4 is a front view of a magazine with the weft shown at the moment after having withdrawn the inserting length of the weft.

In the exemplary embodiment of FIG. 3 the section of ventilation openings 36 begins substantially at the same point as in the arrangement as shown in FIG. 4 and is, however, finished in about the third quadrant of drum 27.

The size of ventilation openings 36, which are arranged in two or three circumferential rows, is e.g. 1.5 to 2 mms with a gauge of about 5 mm.

Sleeve 21 opens tangentially into the rear field of the side wall 31 of drum 27, said sleeve being fastened to said wall e.g. by welding or cementing. Axis 37 of injector 18 is situated in a tangential plane (not shown) to the side wall 31 and is either disposed normal to the surface line 38 of side wall 33 at the point of penetration of axis 37 into side wall 33 (FIG. 6) or forms with the said surface line 38 an angle alpha (d) of 95° to 105° in the anticlockwise direction as shown in FIG. 7.

In the hollow of drum 27, on the rear wall 28, there is fastened a nonrotatable directing body 40 of circular cross-section, e.g. by cementing, said body being made advantageously of plastic material.

The directing body 40 (FIG. 3) is made by a side wall 41 in the form of a frusto-conical shell, which passes over by a wane 42 into a cone 43 with a skewed surface 44 which is situated in the axis (not shown) of drum 27 passing through its exit opening 30. Between the directing body 40 and side wall 31 and the front wall 29 there is a channel 45 which is at first enlarged in the direction towards the exit opening 30 and is then narrowed (FIG. 3). Between top 44 and exit opening 30 there is a gap 46.

The air flow fed tangentially by injector 18 into drum 27 to the rear field 34 of guiding surface 31 creates a helical stream by the effects of the direction of feeding of the air and of centrifugal force acting upon the air flow.

Weft 5, fed by injector 18 into drum 27, is directed by the helical stream and the shape of guiding surface 33 directed into the spatial weft spiral 47 from which said weft is intermittently withdrawn.

The excessive air escapes through ventilation openings 36. The escape of air through said vents simultaneously stimulates the creation of a helical stream inside drum 27 and simultaneously spreads the weft spiral 47 along the shaping guiding surface 33 of magazine 1.

The directing body 40 prevents, on the one hand, the eventual entanglement of weft 5 inside drum 27 and acts, on the other hand, upon the creation of helical air flow.

Between magazine 1 (FIG. 1) and pneumatic insertion nozzle 4 which is connected by tube 48 to a pressure air source (not shown), there is mounted a known braking mechanism 3. Mechanism 3 consists of a stationary lower jaw 49 and an upper jaw 50 arranged on an arm 51 which is swingable about a stationary pivot pin 52 fastened on the frame 10 of magazine 1. The upper jaw 50, which is pressed towards the lower jaw 49 by a coil tension spring 53, is controlled by a cam 54, the movement of which is derived from a driving mechanism (not shown).

Weft inserting nozzle 4 opens by exit tube 55 into the shed 56 made of warp threads 57. At the selvedge of the resulting processed fabric 58 there are mounted known scissors 59 or a burning loop.

The above-described weft inserting device of a pneumatic weaving machine operates as follows:

Weft 5 is withdrawn from a supply bobbin 6 by feeding mechanism 2 which has been adjusted to the required feeding velocity. The thread leaving the feeding mechanism 2 is sucked in by an injector 18 and blown on to a smooth texturing surface of the magazine, such surface being constituted by the rear field 34, where said yarn is directed by the effect of the shape of that surface and the constituted helical air flow into a spatial weft spiral 47.

In the periods between the separate insertions, weft 5 is gripped by jaws 49, 50. At the moment immediately before weft insertion, the jaw 50 is released from jaw 49 by turning cam 54, and thus weft 5 is ejected by the effect of pressure air by the inserting nozzle 4 into open shed 56. Immediately after finishing weft insertion and at a time at which air still escapes from the inserting nozzle 4, weft 5 is again gripped by jaws 49, 50. At the time before, or even after beat up of weft 5 laying freely in shed 56, its part between the selvedge of fabric 58 and insertion nozzle 4 is cut off by means of scissors 59 in the proximity of fabric selvedge 58.

In the following phase, the whole cycle is repeated upon continuous feeding of weft 5 by feeding mechanism 2.

In FIG. 4, the situation [as] *is* shown in drum 27 at the moment after withdrawal of the weft insertion length from magazine 1. Weft 5 is directed from the nozzle of injector 18 to the exit opening 30 of drum 27.

Figure 5:
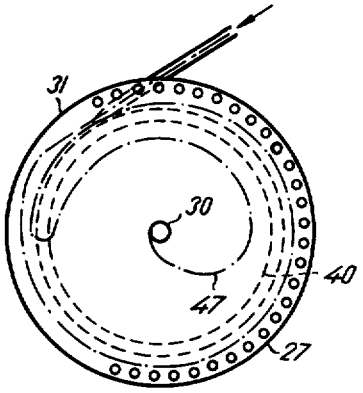
FIG. 5 is a front view of a magazine with the weft shown at the moment before the withdrawal from the magazine.

In FIG. 5, the situation in drum 27 shortly before withdrawal of weft from the spatial weft spiral 47 is shown.

If necessary to change the velocity of feeding weft 5 from the feeding mechanism 2, the attendant adjusts the appurtenant position of the yarn guide 14 along the nip line of feeding rollers, 7, 8. Simultaneously with the movement of yarn guide 14, tube 20 and neck 23 is advanced by resilience of material into the appurtenant position aligned with the yarn guides 14, 15.

In FIGS. 8 to 11, drums 27 are shown with different shapes of the guiding surface 33a–33d, respectively and of the front surface 29a–29d, respectively.

Figure 8:
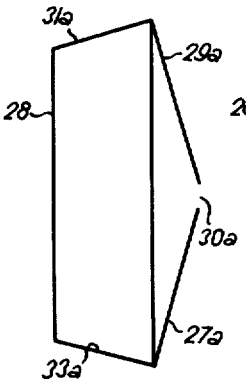
FIGS. 8 to 11 are views in side elevation of various shapes of drums.
Figure 9:
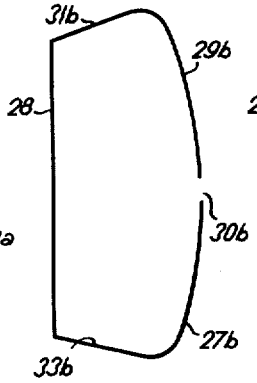

The shape of drum 27 according to FIG. 8 corresponds to the embodiment of magazine 1 as shown in FIG. 1. According to FIG. 9, the guiding surface 33b passes over by a wane into front wall 29b constituted by a skewed convex surface. This arrangement prevents the originating of undesired air turbulence at the point at which the guiding surface passes over to front wall 29a.

Figure 10:
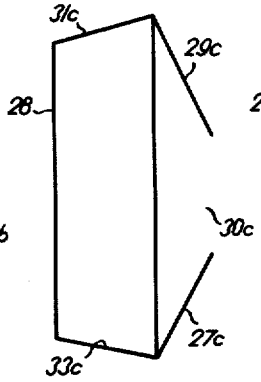

As shown in FIG. 10, surface 33c corresponds substantially to the embodiment of drum 27 as shown in FIG. 8, however, the exit opening 30c has a substantially larger diameter. The dimensions of the diameter of outlet opening 30 can be according to need as large as two-thirds of the maximum diameter of drum 27 without the danger of blowing the spatial weft spiral 47 out of drum 27. The advantage of the embodiment as shown in FIG. 10 consists in easier guiding of weft. It is, however, necessary to grip the weft by jaws 49, 50, in this case reliably, for which purpose a yarn guide is situated in front of the measuring mechanism 3.

Figure 11:
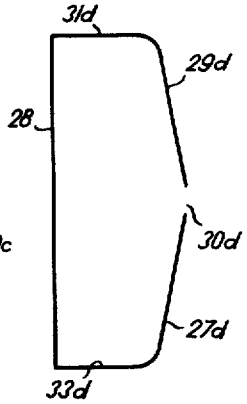

In FIG. 11, a drum 27d is shown which is provided with a side wall [37d] *33d* in the shape of a cylinder shell, which passes over by a wane into front wall 29d in the form of a frusto-conical shell.

Figure 12:
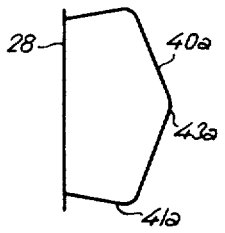
FIGS. 12 to 14 are views in side elevation of various shapes of directing bodies.
Figure 13:
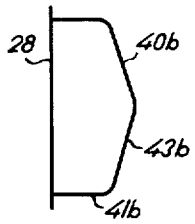
Figure 14:
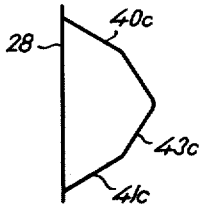

In FIGS. 12 to 14 exemplary embodiments of directing bodies in the shape of bodies of revolution are diagrammatically shown. In FIG. 12, a body 40a is shown, made by a frusto-conical shell 41a, of which the smaller circular base is situated [adjacent] *adjacently* to the rear wall 28 of drum 27, said frusto-conical shell passing over by wane into cone 43a. This and similar embodiments of directing bodies are suitable for most types of weft tape materials of smoother, finer, and more supple character.

The directing body 40b shown in FIG. 13 has a side wall 41b in the form of a cylindrical shell passing over by a wane into a cone 43b.

The directing body 40c shown in FIG. 14 is constituted by a side wall 41c in the form of a frusto-conical shell, of which the larger circular base is situated adjacently to the rear wall 28, said shell passing over by a wane into a cone 43c. The arrangement of directing bodies 40a, 40b, and 40c shown in FIG. 13 and FIG. 14 reduces the withdrawing resistance of weft during operation and is adapted particularly for use with more rigid and thicker tape weft materials.

The helical air flow in drum 27 is constituted by mutual interaction of the position of axis 37 of injector 18 and the shape of the guiding surface 33 of drum 27. According to the embodiment of FIG. 6, the axis 37 of injector is normal to the surface line 38 of side wall 31 in the shape of a frusto-conical shell with a smaller base attached to the rear wall of drum 27. According to the embodiment of FIG. 7, the axis 37 of injector 18 forms with said surface line an angle alpha. According to a third embodiment (FIG. 15), the axis of injector 18 forms with said surface line an angle alpha with the surface line 38 of side wall 31 in the shape of a cylinder.

Figure 6:
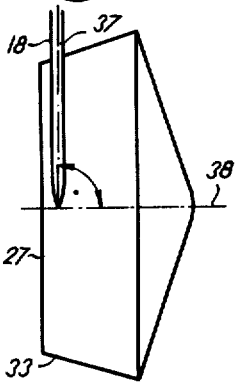
FIG. 6 is a side elevation of a magazine with a side wall in the shape of a frusto-conical shell with the injector axis disposed tangential to the shell.
Figure 7:
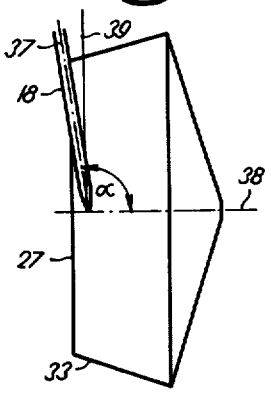
FIG. 7 is a view similar to FIG. 6 with the injector axis offset from the position thereof shown in FIG. 6.

According to the embodiment of FIG. 6, a helical whirl arises by influence of centrifugal force by bending the fed air flow by guiding surface 33. One of the components of centrifugal force causes axial deviation of the air flow, there thus arising an air helical flow on the guiding surface 33. The slope, or the angle, respectively of the helix pitch, which represents the shape of the air flow path, is given by the conicity of the guiding surface 33.

Figure 15:
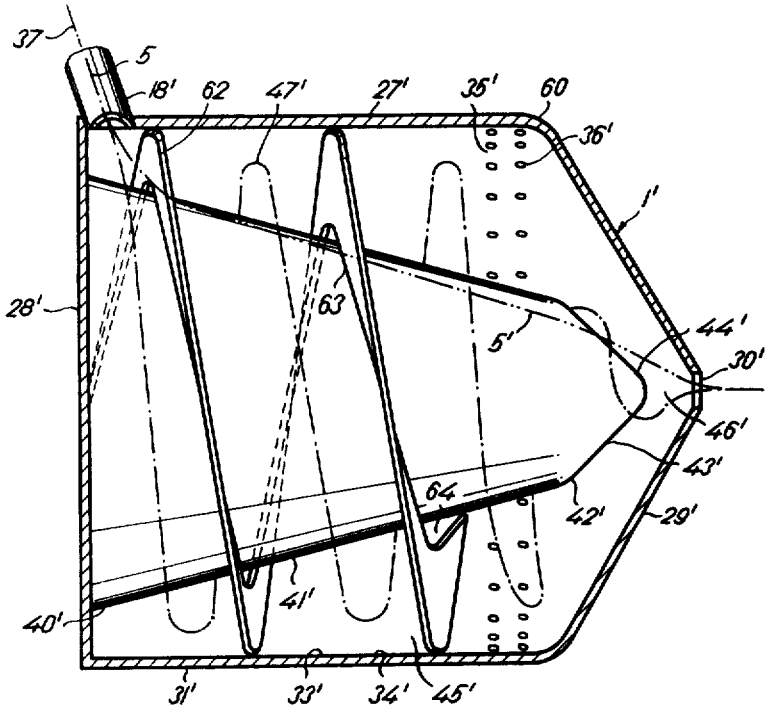
FIG. 15 illustrates in axial section a magazine provided with a helical thread.

According to the embodiment of FIG. 15, the helical whirl is a consequence of the position of axis 37 of injector 18 in view of the appurtenant surface line of the cylindrical rotary guiding surface 33. The slope of the air flow path is given by the slope of an imaginary helix, embracing the cylindrical guiding surface 33.

According to the embodiments of FIGS. 6 and 7, a helical air flow is created on the rear field 34 which directs weft 5 into the spatial spiral and, according to FIG. 15, into a spatial helix.

Figure 2:
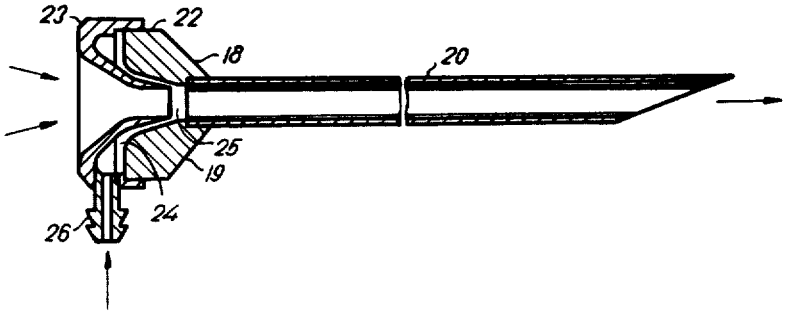
FIG. 2 depicts an injector in longitudinal axial section.

Parts in FIG. 15 which are generally similar to those in FIGS. 1-3 are designated by the same reference characters with an added prime (').

In FIG. 15, an embodiment of magazine 1' for larger fabric widths is shown, that is, for longer weft lengths. The purpose of this embodiment is to increase the number of windings of the spatial spiral or helix.

Drum 27' is constituted by the conventional rear wall 28', and a side wall 31' in the form of a cylindrical shell which passes over by wane 60' into the front wall 29' in the form of a frusto-conical shell which is provided with an exit opening 30'. The guiding surface 33', which is substantially wider than the same surface in the magazine as shown in FIG. 3, has a rear smooth field 24' and a front field 35' which is provided on a part of the surface with vents 36'. The width of the rear field 34' is considerably larger than the width of the front field 35'. The tube of injector 18' opens obliquely in a tangential direction into side wall 31'.

Inside drum 27' there is mounted the directing body 40', which is constituted by a side wall 41' in the form of a frusto-conical shell, which is fastened with its larger circular base to the rear wall 28', the side wall 41' passing over by wane 42' into cone 43' which has an oblique top 44 situated on the axis of drum 27 (not shown). Between the directing body 40' and side wall 31' and the front wall 29' there is a gap 45. Between top 44' and exit opening 30 there is situated a gap 46'.

On the rear field 34' of the guiding surface there is fastened by welding or cementing a screw thread 62 of metal or a suitable plastic material, the purpose of which is directing the air flow fed from the injector 18' into a helical flow. Between the top edge 63 of screw thread 62 and directing body 40' there is a passage 64 for weft 5' which is withdrawn from the spatial weft helix 47'. The width of passage 64 is substantially the same about the whole circumference of the screw thread 62.

The function of magazine 1' as shown in FIG. 15 is the same as that of magazine 1, as shown in FIG. 3. The weft fed into drum 27' by injector 18' is directed by the effect of the helical flow of air created by the surface of the screw thread 62 into the spatial weft helix 47', from which the insertion weft length is withdrawn in the weft inserting intervals. The course of weft 5 in drum 27' immediately after weft insertion is represented by reference numeral 5''. The weft is directed substantially straight from the mouth of injector 18' along the directing body 40' to the exit opening 30'.

Figure 16:
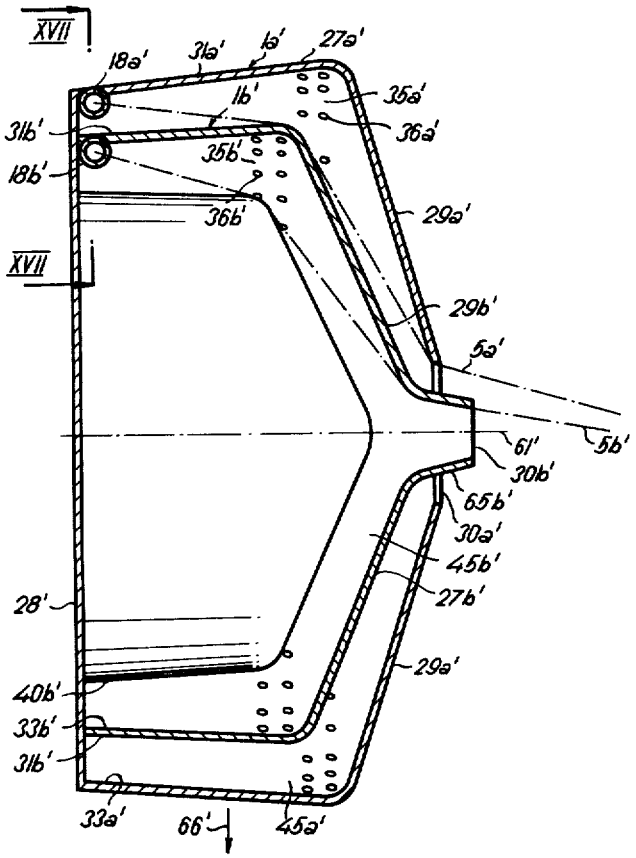
FIG. 16 is a view in axial section of a combination of both the outer and inner magazine.

In FIG. 16, an exemplary embodiment of the combination of two magazines 1a, 1b is shown, which is adapted for use in shuttleless weaving machines for weaving by "pic a pic" method or for shuttleless weaving machines with weft change.

In the hollow of the outer drum 27a' is mounted coaxially the inner drum 27b' with the common rear wall 28'. The side wall 31b' and the front wall 29b' of the inner drum 27b' constitute the directing body of outer drum 27a'. Into the side wall 31a' of the outer drum 27a' there opens the injector 18a' and in the side wall 31b' of the inner drum 27b' of the injector 18b', which is parallel to the injector 18a' and passes with sealing through the side wall 31a'. The arrangement of the two injectors 18a', 18b' is obvious from FIG. [18,] *17,* which represents a section through line XVII—XVII of FIG. 16. The directing body 40b' of inner drum 27b' is constituted like a body, of which the form is similar to one of the forms as shown in FIGS. 12 to 14.

The front wall 29a' of outer drum 27a' converges into the exit opening 30a' and the front wall 29b' of the inner drum 27b' into neck 65b', at the end of which is an exit opening 30b'. The neck 65b' emerges from the exit opening 30a' of the outer drum 27a'. The directing body 40b' is separated from the side wall 31b' and the front wall 29b' by gap 46b'. Between the directing body of the outer drum 27a', constituted by the side wall 31b' and the front wall 29b' of inner drim 27b', and side wall 31a and front wall 29a' of outer drum 27a', gap 45a' is situated. Another embodiment is possible in which the exit opening 30b' is at level with exit opening 30a'. The first embodiment advantageously secures separated guiding of the two wefts 5a', 5b'.

The width of the guiding surface 33a' is larger than the width of the inner guiding surface 33b'. In the exemplary embodiment of the device the two front fields 35a', 35b' are arranged beside each other, however, a gap can be between them, of which the width depends on the difference of the widths of the two fields.

The two magazines 1a', 1b' operate independently of each other. From the outer drum 27a', the weft 5a' is withdrawn via annulus 30a' and from the inner drum 27b' via circular exit opening 30b'. The advantage of this arrangement consists in the relatively small dimensions of the device.

Figure 17:
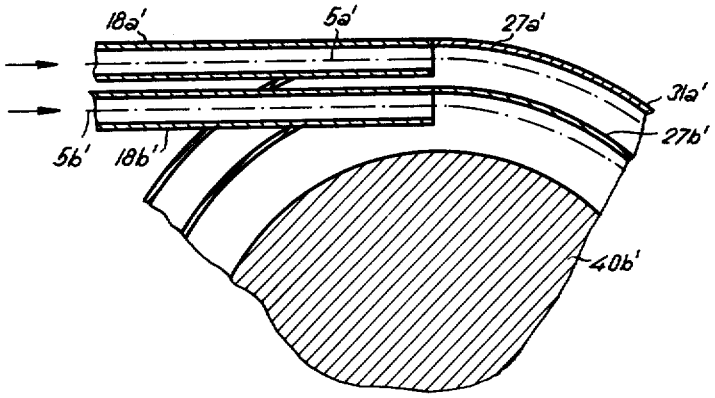
FIG. 17 is a section on the plane XVII—XVII of FIG. 16.

In the arrangement of FIGS. 16 and 17 a separate pair of feeding rollers 7, 8 must be used for each weft thread, such feeding rollers being constructed and arranged as shown in FIG. 1. All such pairs of the feeding rollers 7, 8 may have a common drive, the individual yarn guides 14 being individually adjustable along the nip of the feeding rollers 7, 8. It should be noted that the feeding rollers 7, 8 are of frusto-conical shape, so that the speed of feeding the yarn may be varied by changing the position of the yarn guiding eye on the arm 14, as is indicated by the double-ended arrow 17 in FIG. 1.

Figure 18:
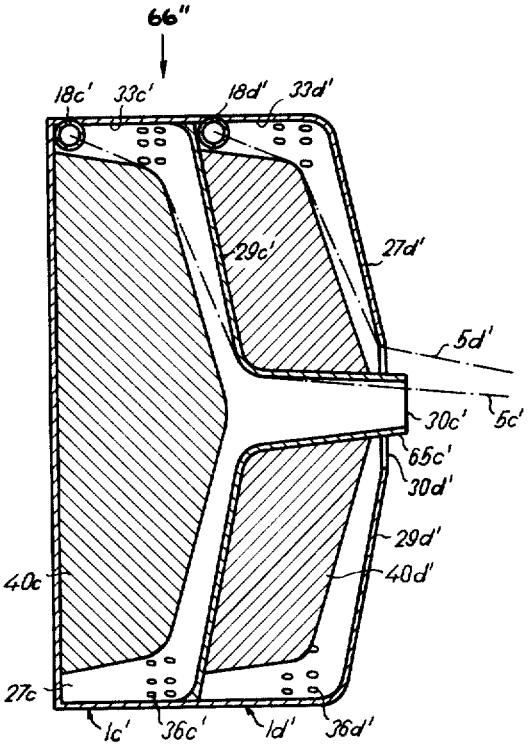
FIG. 18 is a view in axial section of a combination of two magazines arranged behind each other.
Figure 19:
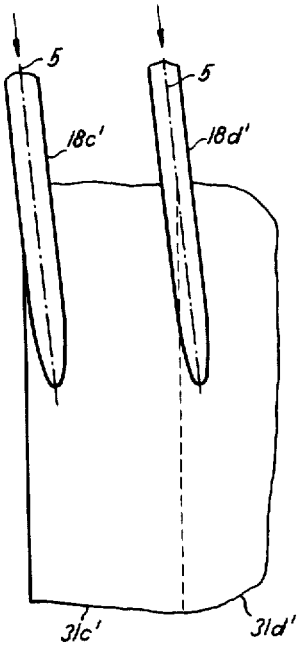
FIG. 19 is a fragmentary view in side elevation of a magazine as shown in FIG. 18.
Figure 20:
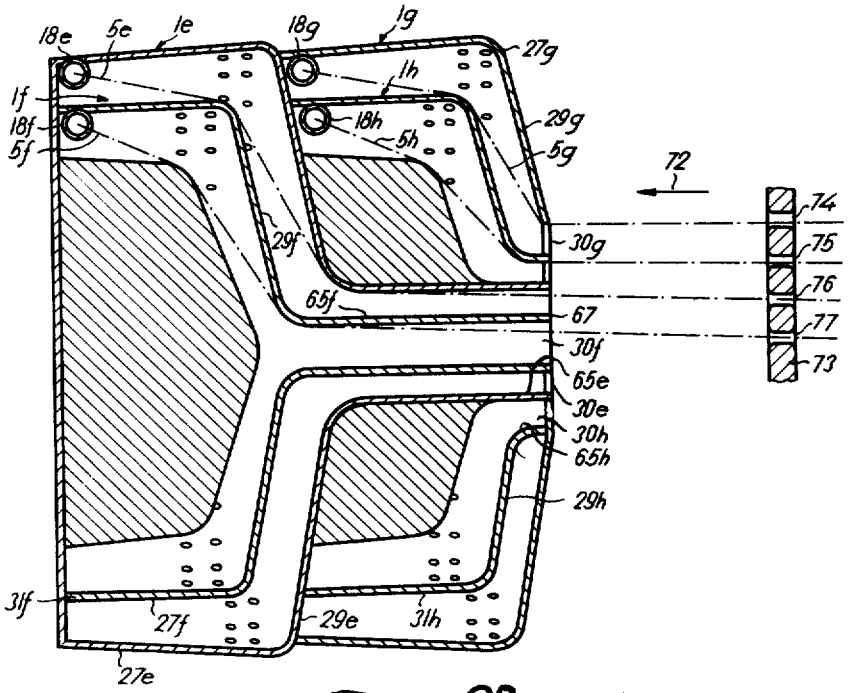
FIG. 20 is a view in axial section of a combination of our magazines.
Figure 23:
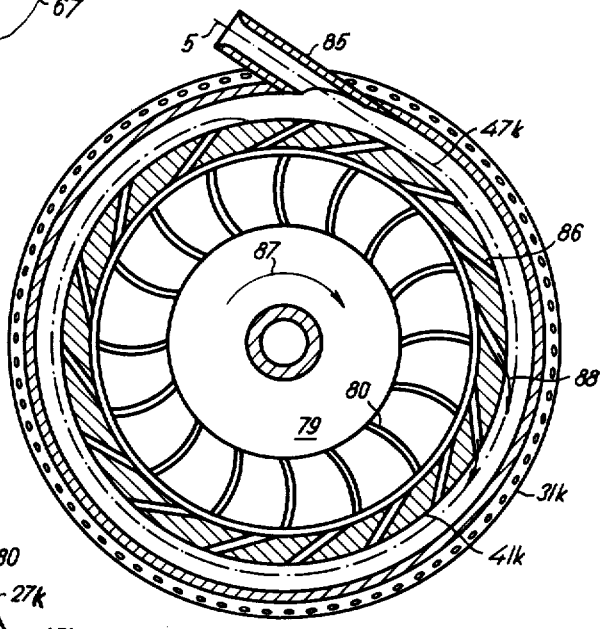
FIG. 23 is a section on plane XXIII—XXIII of FIG. 22.
Figure 24:
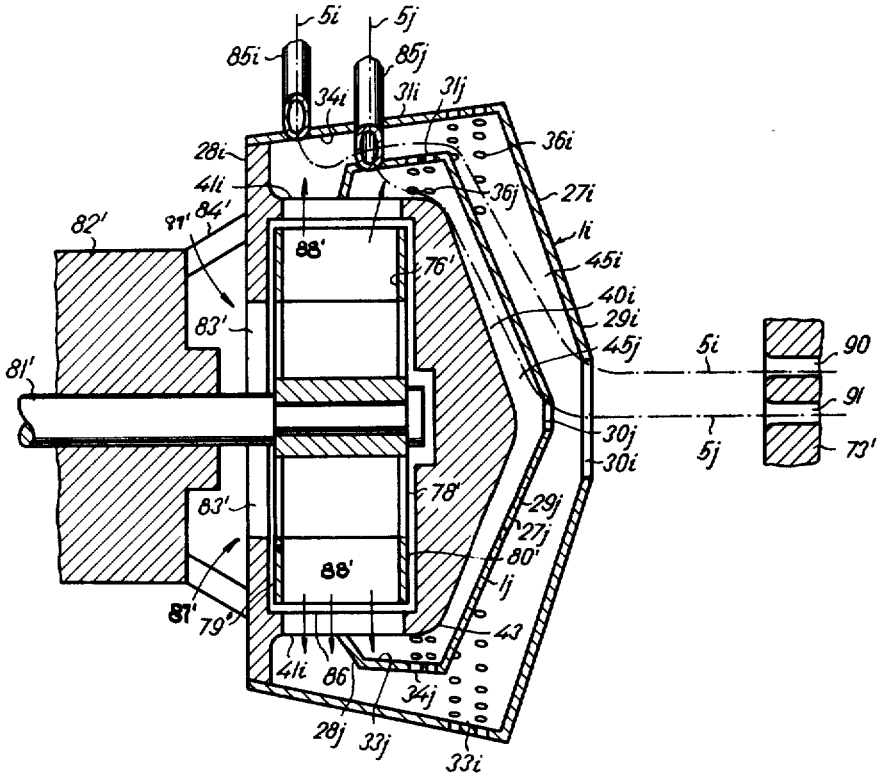
FIG. 24 is a view in axial section of a combination of two magazines with a fan.

In the further embodiments of the apparatus shown in FIGS. 18–24, inclusive, particularly FIGS. 18, 20, and 24, a separate pair of feeding rollers is also used for each weft thread. Such feeding rollers are constructed and operated in the same manner as those shown at 7 and 8 in FIG. 1.

When weaving with more than two types of wefts, it is necessary to interrupt feeding of those weft threads into the magazines, which are inoperative at that time, that is, which are not being inserted into the shed. This may be achieved, for example, by separating the feeding rollers 7, 8 for each other, and by using a control device for the rollers 7, 8, such control device, in turn, being controlled by the pattern card of the machine, or being controlled by another selection device and the like.

There are, however, certain disadvantages in the device of FIGS. 16 and 17. One is the different diameters of the two drums 27a', 27b'. Another is the manner of flow of the air between the two drums 27a', 27b'. The air from the inner drum 27a' escapes through vents 36b' into the hollow of outer drum 27a' and only afterwards through vents 36a' into the ambient atmosphere. In this embodiment, it is necessary to prevent the possibility of disturbing the air flow in the outer drum 27a'. In view of the above-mentioned facts, it is suitable to increase accordingly the number and to enlarge the diameter of the vents 36a' of the outer magazine 1a'.

An exemplary embodiment of the pair of magazines 1a', 1b' as shown in FIG. 16 is made according to a first alternative embodiment (FIGS. 18 and 19). FIGS. 19 and 20 show further modifications of FIG. 16.

In FIG. 18 the arrangement of two substantially geometrically congruent magazines 1c', 1d' is diagrammatically shown, said magazines being arranged coaxially behind each other. The rear drum 27c' is provided with a directing body 40c', injector 18c', inner guiding surface 33c' and front wall 29c' passing over into neck 65c', which is provided at its end with an exit opening 30c'. The front drum 27d' has a directing body 40d', an injector 18d', a guiding surface 33d' and a front wall 29d', which narrows into exit opening 30d'. The neck 65c' projects from the exit opening 30d' of front drum 27d'. The rear wall of the front drum 27d' is the front wall 29c' of the rear drum 27c'.

Weft 5c is fed into magazine 1c' by injector 18c' and weft 5d into magazine 1d' by injector 18d'. In both magazines 1c', 1d' are constituted independent helical air flows, which direct the fed weft 5c', 5d' into a spatial helix, from which the inserting length of weft is withdrawn through exit openings 30c', 30d'.

The embodiment of each of magazines 1c', 1d' is the same as in the embodiment shown in FIG. 15. In FIG. 19, which is a partial side view in the direction of arrow 66" in FIG. 18, an oblique passing over of injector 18c', 18d' into side walls 31c', 31d' is obvious. However, embodiments of the two magazines according to the modifications as shown in FIG. 6 on the one hand and FIG. 7 on the other are possible.

The arrangement of the pair of magazines 1c', 1d' as shown in FIG. 18 [iS] *is* intended for the same purpose as the embodiment of the pair of magazines 1a', 1b' as shown in FIG. 16. In the embodiment of magazines 1c', 1d' the air from each drum 27c', 27d' emerges independently through vents 36c', 36d' whereupon the disadvantage as above-described for the embodiment of FIG. 16 is eliminated.

In FIG. 20, an axial section through the coaxial arrangement of four combined magazines 1e, 1f, 1g, 1h is diagrammatically shown, for weaving machines with four color weft changes. This arrangement is substantially a combination of doubled magazines as shown in FIGS. 16 and 18.

The device as shown in FIG. 20 consists of a pair of rear magazines 1e, 1f and a front pair of magazines 1g, 1h, the embodiment of said pairs being substantially in accordance with the embodiment of pairs as shown in FIG. 16. The front wall 29f of inner drum 27f, which has together with the side wall 31f the function of an outer directing body of outer drum 27e, converges into neck 65f provided at its end with exit opening 30f. The front wall 29e of the outer drum 27e also converges into neck 65e provided at its end with exit opening 30e.

The front pair of magazines 1g, 1h has an inner drum 27h, of which the side wall 31h and the front wall 29h form a directing body of outer drum 27g. The front pair of magazines 1g, 1h is arranged on the front wall 29e of outer magazine 1e of the rear pair of magazines 1e, 1f, so that a part of said front wall 29e forms the rear wall for the front pair of magazines 1g, 1h.

The front wall 29g of the outer magazine 1g narrows convexly in the direction into the exit opening 30g and the front wall 29h of the inner magazine 1h by a short neck 65h into the exit opening 30h. All outlet openings 30e, 30f, 30g are at one level.

Figure 21:
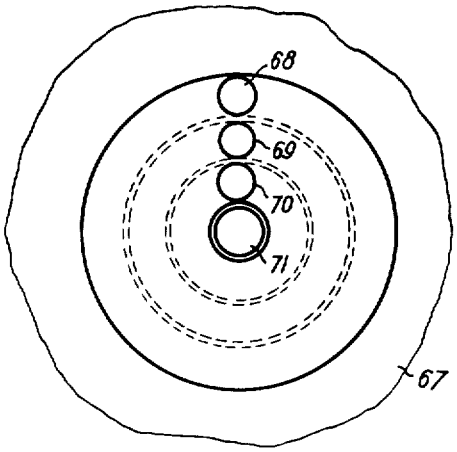
FIG. 21 is a fragmentary view in front elevation of a magazine as shown in FIG. 20.

In order to withdraw the wefts correctly from the magazines a circular plate 67 is mounted at the level of exit openings 30e, 30f, 30g, 30h, in which are mounted in one row the exit openings 68, 69, 70, 71 for the wefts 5e, 5f, 5g, 5h as can be seen from FIG. 21, which represents the outlet part of the combined magazines in a view in the direction of arrow 72 from FIG. 20. The guiding openings 68, 69, 70 are only a little smaller than the guiding opening 71, which is at a level with the exit opening 30f of drum 27f. Between the magazines 1e, 1f, 1g, 1h and a measuring mechanism (not shown ) there is mounted yarn guide 73 with guiding eyelets 74, 75, 76, 77 in which there are threaded wefts 5e, 5f, 5g, 5h. Each of the four magazines 1e, 1f, 1g, 1h operates independently of the others and makes of the fed weft yarns 5e, 5f, 5g, 5h (not shown) spatial weft spirals, from which the weft inserting length is withdrawn through the outlet openings 30e, 30f, 30h via guiding eyelets 74, 75, 76, 77 to a weft inserting nozzle (not shown).

Figure 22:
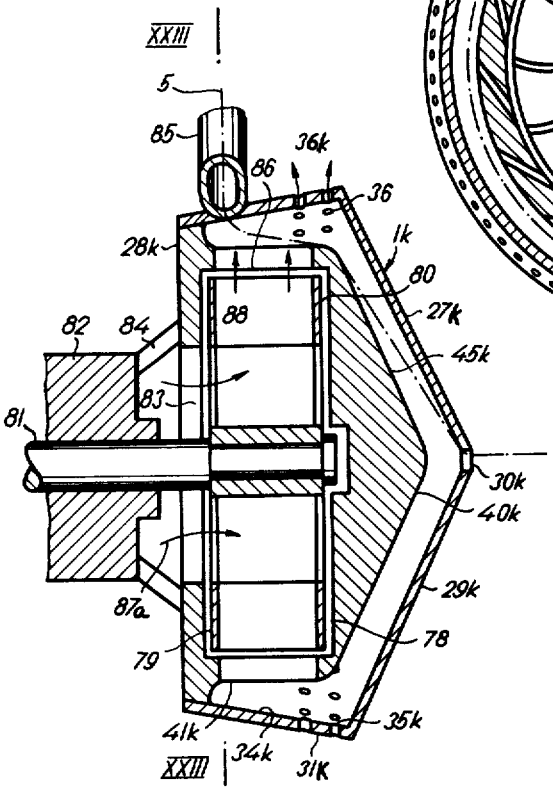
FIG. 22 is a view in axial section of a magazine with a fan.

In all weft magazines hitherto described and shown, the helical air flow is formed of a pressure air flow fed in injector 18. In FIGS. 22, 23 there is diagrammatically shown an embodiment of the magazine in which the pressure fluid is developed directly in the magazine 1k.

The magazine [k1] *1k* includes a drum 27k constituted by rear wall 28k, side wall 31k in the form of a frusto-conical shell, of which the smaller circular base is attached to the rear wall 28k and the front wall 29k has the form of a frusto-conical shell, which convexly narrows into exit opening 30k. Inside drum 23k there is mounted a directing body 40k which in the exemplary embodiment forms one assembly with the rear wall 28k in the cylindrical hollow 78 of directing body 40k. A fan wheel 79 with blades 80 is arranged coaxially of drum 27k, said fan wheel being mounted on shaft 81 of a partially shown electric motor 82 which is mounted on a frame (not shown) of the weaving machine. Shaft [31] *81* passes through a circular sucking opening 83 which is made in the rear wall 28k of drum 27k. Magazine 1k is mounted by means of holders 84, e.g. to electric motor 82.

The inner guiding surface 33k is separated into two parallel fields 34k, 35k. Feeding tube 85 opens tangentially into rear field 34k. The side wall 41k of directing body 40k is in the shape of a cylindrical shell, and is provided throughout the whole circumference with channels 86, which are tangentially directed to a fan wheel 79, and their inclination is in accordance with the direction of rotation of the fan as indicated by arrow 87 (FIG. 23).

The output of the fan, the number of channels 86, their cross-section and the inclination of the side wall 31k are chosen such that the created helical flow of air should direct the fed weft 5 into a spatial weft spiral 47 (FIG. 23). The channels 86 are directed either only against the rear field 34k or also into the front field 35k provided with vents 36k as in the exemplary embodiment shown in FIG. 22.

The fan wheel 79, which is driven according to the exemplary embodiment by an electric motor 82, can be imparted rotary motion by a transmission from any rotating element of the weaving machine, e.g., the lower or upper shaft.

Weft 5 is fed into feeding tube 85, said weft being fed at an appurtenant adjusted speed by means of a feeding mechanism (not shown).

The device as shown in FIGS. 22, 23 operates as follows:

Upon rotation of the fan wheel 79, blades 80 suck in air through the sucking opening 83 from the ambient atmosphere in the direction of arrows 87 and eject air through the channels 86 in the direction of arrows 88 via an annular hollow against an inner rotary guiding surface 33k. By influence of the tangential feeding of partial air flows, the pressure fluid is brought inside the annular hollow to rotate and simultaneously, upon influence of centrifugal force, it is imparted a helical flow along the rotary guiding surface 33k to its larger diameter. The excessive air escapes through vents 36k. Weft 5, which enters magazine 1k of feeding tube 85, is entrained by the helical air flow and directed into the spatial weft spiral 47k from which is withdrawn the insertion length intermittently through exit opening 30k.

A substantial advantage of this arrangement of the magazine as compared to magazines with an injector air feeding is that they operate without a pressure air source, this being particularly valuable upon applying the device according to the present invention in a weaving machine with hydraulic weft insertion. It is economical to apply a magazine as shown in FIGS. 22, 23 also in weaving machines with pneumatic weft insertion where the consumption of pressure air is diminished.

In FIG. 24 a device according to the present invention is diagrammatically shown, including the combination of two magazines 1i, 1j for shuttleless weaving machines with a two color weft change.

The device consists of an outer magazine 1i and an inner magazine 1j. The outer drum 271, which is substantially of the same construction as drum 27 in FIG. 22, is constituted by the rear wall 28i, the side wall 31i in the form of a frusto-conical shell, of which the smaller circular base is attached to the rear wall 28i and the front wall 29i, also in the form of a frusto-conical shell, which narrows convexly into exit opening 30i.

Inside drum 27i there is mounted a directing body 40i in the cylindrical hollow 78′ of which is mounted a fan wheel 79′ mounted on shaft 81′ of electric motor 82′. Shaft 81′ projects through the circular sucking opening 83′ from drum 27i, which is fastened by holders 84′ to electric motor 82′. Into the rear field of the inner rotary guiding surface 33i there opens tangentially the feeding tube 85i, in which weft [51] *5i* is threaded. In the side wall 41i of the directing body 40i there are arranged channels 86′.

The inner drum 27j consists of a rear wall 28j in the form of an annular surface, the side walls 31j in the form of a frusto-conical shell of which the smaller circular base is attached to the rear wall 28j and the front wall 29j, which converges into exit opening 30j which is parallel with the exit opening 30i.

The side wall 31i is provided with vents 36i and side wall 31j with vents 36j.

The rear wall 28j longitudinally separates the channels 86 into two parts, of which the rear part is directed against the rear wall 34i of the inner rotary guiding surface 33i of the outer drum 27i and the front part against the rear wall 34j of the inner rotary guiding surface 33j of the inner drum 27j.

The side wall 31j and the front wall 29j of inner drum 27j constitute a directing body of the outer drum 27i. The directing body of the inner drum 27j is a cone 43 and a part of the side wall 41 of the directing body 40. The feeding tube 85j opens tangentially into the side wall 31j of the inner drum 27j, weft 5j being threaded into said feeding tube which passes through the side wall 31j of the outer drum 27i.

Between magazine 1i and a measuring mechanism (not shown) there is mounted a yarn guide 73′ with guiding eyelets 90, 91 for preventing mutual entanglement of wefts 5i, 5j.

Between the directing body of inner drum 27j and side wall 31j and front wall 29j, there is a gap 45j. Between the directing body of outer drum 27i, constituted by side wall 31j and front wall 29j of inner drum 27j and side wall 31i and front wall 29i, there is a gap 45i.

The device as shown in FIG. 24 operates as follows:

By rotary motion of the fan wheel 79′, blades 80′ suck in air from the ambient atmosphere through sucking opening [81′] *83′* in the direction of arrows 87′ and press said air through channels 86′ in the direction of arrows 88′ tangentially, on one hand, against the rear field 34i [of the inner guiding field 34j of the inner guiding surface] *of the outer guiding wall 31i and, on the other hand, on the inner guiding surface* 33j of inner drum 27j.

In both drums 27i, 27j, there is brought about a helical air flow which directs the fed wefts 5i, 5j into spatial spirals, of which the weft supply for one pick is withdrawn in the given sequence by guiding eyelets 90, 91. The excessive air escapes through vents 36i, 36j.

Wefts 5i, 5j are fed in the given case at one-half the speed of the weft velocity in the embodiment as shown in FIGS. 22, 23, and thus the measured weft supply for one pick is formed in the course of two revolutions of the weaving machine.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. In a method of preparing weft supply in a magazine for weft insertion in shuttleless looms, particularly looms with pneumatic or hydraulic weft insertion, by prolonging the yarn path in a magazine into which the weft is continuously fed upon being withdrawn from a supply bobbin, the weft being withdrawn from the magazine in weft inserting intervals in a length sufficient for one pick, the improvement which comprises developing a helical air flow inside the magazine which directs the fed weft into a spatial spiral, and withdrawing the inserting weft length axially from such spatial spiral.

2. A method of preparing a weft supply in a magazine as claimed in claim 1, wherein the helical air flow is created by pressure air fed into the magazine by means of an injector.

3. A method of preparing a weft supply in a magazine as claimed in claim 1, wherein the helical air flow is created by pressure air inside the magazine a fan, the pressure of which is generated, means for continuosly feeding the weft into the magazine upon being withdrawn from a supply bobbin, means for withdrawing the weft from the magazine in weft inserting intervals in a length sufficient for one pick, means for creating a helical air flow in the magazine which directs the fed weft into a spatial spiral and means for guiding axially the inserting length of weft from said spatial spiral.

4. Apparatus for preparing weft supply in a magazine for weft insertion in shuttleless looms, by prolonging the yarn path by the action of an air flow in the magazine into which the weft is continuously fed upon being withdrawn from a supply bobbin[,] the weft being withdrawn from the magazine in weft inserting intervals in a length sufficient for one pick, comprising a weft feeding mechanism, a weft measuring mechanism, and a weft inserting mechanism, the weft measuring mechanism being arranged upstream of the weft inserting mechanism, means for continuously feeding the weft into the magazine upon being withdrawn from a supply bobbin, means for withdrawing the weft from the magazine in weft inserting intervals in a length sufficient for one pick, means for creating a helical air flow in the magazine which directs the fed weft into a spatial spiral and means for guiding axially the inserting length of weft from said spatial spiral.

5. Apparatus as claimed in claim 4, wherein each magazine comprises a hollow drum with a rear wall connected by a side wall to a front wall in the form of a convex surface of revolution provided in the middle with an exit opening for the weft, an injector which opens into the drum tangentially of the side wall for feeding pressure air into the drum, the drum having an inner annular guiding surface which directs the fed air flow into a spatial spiral.

6. Apparatus as claimed in claim 5, wherein said rotary guiding surface has two parallel annular fields of which the rear field into which the injector opens and a part of the front field constitute a path for the fed air flow, while the remaining part of the front field is provided with vents for the outlet of pressure air from the drum, and comprising a coaxial directing body in the hollow of the drum on the rear wall thereof, the directing body being of circular cross-section and guiding the withdrawn weft, said directing body being separated from the side wall and the front wall of the drum by a gap.

7. Apparatus as claimed in claim 6, wherein the side wall of the drum has the form of a circular cylindrical shell.

8. Apparatus as claimed in claim 6, wherein the side wall of the drum has the form of a frusto-conical shell attached with its smaller circular base to the rear wall of the drum.

9. Apparatus as claimed in claim 6, wherein the vents for the outlet of pressure air are distributed on at least a part of the circumference of the front field of the annular guiding surface.

10. Apparatus as claimed in claim 9, characterized in that the axis of the injector is situated in a plane tangential to the side wall of the drum and normal to the surface line of such side wall, said surface line passing through the point of penetration of the axis of the injector into the side wall of the drum.

11. Apparatus as claimed in claim 9, wherein the axis of the injector is situated in a plane tangential to the side wall of the drum and forms with the surface line of said side wall an angle of from 95° to 105° in the counterclockwise direction, said surface line passing through the point of penetration of the axis of the injector into said side wall.

12. Apparatus as claimed in claim 6, comprising another magazine mounted inside said magazine coaxially thereof, the side wall and the front wall of the drum of the inner magazine constituting a directing body of the outer drum, an injector passing through the side wall of the outer drum, the injectors for the inner and outer drums being parallel, the outer drum having an annular guiding surface larger than the width of the annular guiding surface of the inner drum, the two front surfaces of the annular guiding surfaces being coaxial of the axis of the inner and outer drums, the front wall of the inner drum converging into a neck which is provided with an exit opening on its end, said opening being coaxial of and flush with the exit opening of the outer drum.

13. Apparatus as claimed in claim 6, comprising a second magazine coaxially attached to the first recited magazine in such manner that the two magazines are arranged one behind each other, the rear wall of the front drum being the front wall of the rear drum, the wall of the rear drum converging into a neck with an exit opening at its end, said exit opening being flush with an exit opening of the front drum.

14. Apparatus as claimed in claim 6, comprising a screw thread on the rear field of the annular guiding surface for directing the fed air flow into a spatial spiral, there being a passage between the top edge of the annular guiding surface and the directing body for the withdrawn weft.

15. Apparatus as claimed in claim 14, wherein one pair of outer and inner drums is coaxially attached to a second pair of inner and outer drums in such manner that the two pairs are arranged one behind the other and the front wall of the outer drum of the rear pair of drums constitutes the rear wall of the front pair of drums, the front walls of the rear pair of drums and the front wall of an inner drum of the front pair of drums converging into coaxially arranged necks of which the exit openings are flush with the exit opening of the outer drum of the front pair of drums.

16. Apparatus as claimed in claim 15, wherein the four exit openings are covered by a plate in which there are arranged in a row guiding exit openings for the four wefts.

17. Apparatus as claimed in claim 15, wherein between the measuring mechanism and the front pair of drums there are mounted four guiding eyelets for withdrawing four wefts from the respective drums.

18. Apparatus as claimed in claim 4, wherein the weft inserting mechanism includes a nozzle for pneumatic or hydraulic weft insertion, the magazine is a substantially hollow drum with a rear wall provided with at least one sucking opening and connected with the front wall in the form of a convex surface of revolution provided with an exit opening amidst for the weft, the drum having a side wall of which the inner annular guiding surface is in the form of a frusto-conical shell attached with its smaller circular base to the rear wall of the drum which constitutes a path for the air flow and has two parallel fields of which the rear field into which there opens tangentially the feeding tube for the weft withdrawn from the feeding mechanism is a smooth surface, and the front field is at least at a part of its surface provided with vents for the exit of air from the drum, within the drum and on the rear wall thereof there being arranged parallel with the drum a fan wheel surrounded by the wall of a directing body of circular cross-section for the withdrawn weft, said directing body being separated from the side wall and front wall of the drum by a gap, said front wall being provided with tangential channels confronting the fan wheel, said channels being directed toward the annular guiding surface of the side wall to directing the partial air flows from channels into the helical air flow.

19. Apparatus as claimed in claim 17, wherein inside the hollow of one magazine there is mounted coaxially an inner magazine of which the rear wall, in the form of an annular surface, separates the channels [transversally] *transversely* into two parts, of which one is directed toward the rear field of the outer drum through which the feeding tube of the inner drum passes, and the other is directed toward the rear field of the inner drum, the side wall and the front wall of the inner drum constituting a directing body of the outer drum.

20. Apparatus as claimed in claim 5, wherein the tube of the injector and the feeding tube are resiliently flexible for adjustment of its weft entrance part along the nip line of the feeding rollers of the feeding mechanism.

21. Apparatus as claimed in claim 5, wherein the tube of the injector is fastened in a sleeve mounted on the side wall of the magazine.

22. Apparatus as claimed in claim 21, wherein the sleeve of one of the injector tube and feeding tube is rigid, and thus upon advancement of the resilient tubes along the nip line of the feeding rollers of the feeding mechanism the entrance angle under which the air flow and the weft enter the magazine are not affected.

*23. Apparatus for preparing a length of weft yarn in a magazine for weft insertion in a shuttleless loom, comprising in combination,*

*a housing having an annular space, inlet and outlet openings connected to said space;*

*means for feeding weft yarn to said inlet opening from a supply bobbin;*

*means for creating a helical air flow in said annular space by means of air entering through the inlet opening and exiting through the outlet opening for depositing a length of yarn within said annular space in a helix; and*

*means for axially withdrawing said length of yarn from said annular space through said outlet opening for insertion in a shuttleless loom.*

*24. Apparatus for preparing a length of weft yarn in a magazine for weft insertion in a shuttleless loom, comprising in combination,*

*a housing having a chamber which is circular in cross-section, said housing having inlet and outlet openings;*

*means for feeding weft yarn through said inlet opening from a supply bobbin;*

*wall means in said chamber which forms an annular space in said chamber;*

*first actuator means for creating a helical air flow within said annular space for depositing a length of weft yarn within said annular space in a helix; and*

*second actuator means for axially withdrawing said length of weft yarn from said annular space through said outlet opening for insertion in a shuttleless loom.*

*25. In a method of preparing a length of weft yarn in a magazine for weft insertion in a shuttleless loom, the step of creating a helical air flow in said magazine which causes an intermittent prolongation of the path of the weft yarn in the shape of a helix as it passes through said magazine, and the step of ejecting the weft yarn from the magazine in a substantially axial direction relative to said helical air flow.*

* * * * *